United States Patent
Lee et al.

(10) Patent No.: US 9,991,491 B2
(45) Date of Patent: Jun. 5, 2018

(54) SLURRY INCLUDING INORGANIC PARTICLES WITH IMPROVE DISPERSIBILITY BY CONTROLLING PARTICLE SIZE AND SLURRY VISCOSITY

(71) Applicants: LG Chem, Ltd., Seoul (KR); TORAY INDUSTRIES, INC., Tokyo (JP)

(72) Inventors: Joo-Sung Lee, Daejeon (KR); Su-Jin Yoon, Daejeon (KR); Da-Kyung Han, Daejeon (KR); Bo-Kyung Ryu, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 175 days.

(21) Appl. No.: 14/258,137

(22) Filed: Apr. 22, 2014

(65) Prior Publication Data
US 2014/0227593 A1    Aug. 14, 2014

Related U.S. Application Data

(63) Continuation of application No. PCT/KR2013/011056, filed on Dec. 2, 2013.

(30) Foreign Application Priority Data

Nov. 30, 2012    (KR) .......................... 10-2012-0138434
Nov. 29, 2013    (KR) .......................... 10-2013-0147428

(51) Int. Cl.
*H01M 2/14*    (2006.01)
*H01M 2/16*    (2006.01)
(Continued)

(52) U.S. Cl.
CPC ........... *H01M 2/166* (2013.01); *H01M 2/145* (2013.01); *H01M 2/16* (2013.01); *H01M 4/0404* (2013.01);
(Continued)

(58) Field of Classification Search
CPC .... H01M 2/146; H01M 2/166; H01M 4/0404; H01M 4/13; H01M 4/139
(Continued)

(56) References Cited

U.S. PATENT DOCUMENTS 6,632,561 B1    10/2003  Bauer et al.
2004/0086782 A1*    5/2004  Zhang ................. H01M 2/1653
429/142

(Continued)

FOREIGN PATENT DOCUMENTS

CN    102190323 A    9/2011
CN    102770984 A    11/2012
(Continued)

OTHER PUBLICATIONS

Mitsubishi, Table of Physical and Chemical Properties, www.carbonblack.jp/en/product/list2_01.html, accessed on Aug. 25, 2016.*

(Continued)

*Primary Examiner* — Sean P Cullen
(74) *Attorney, Agent, or Firm* — Lerner, David, Littenberg, Krumholz & Mentlik, LLP

(57) ABSTRACT

The present disclosure relates to an invention directed to controlling a viscosity of a slurry used to manufacture an electrochemical device, by adjusting a particle diameter of an inorganic matter that is an ingredient of the slurry, so that a sinking rate of the inorganic particles may remarkably slow down and dispersibility may be dramatically improved, and as a result, the content of the inorganic particles may relatively increase and the inorganic particles may be uniformly distributed in a coating layer on a substrate, thereby preventing a reduction in battery performance.

11 Claims, 4 Drawing Sheets

(51) Int. Cl.
| | |
|---|---|
| *H01M 4/04* | (2006.01) |
| *H01M 4/13* | (2010.01) |
| *H01M 4/139* | (2010.01) |
| *H01M 4/131* | (2010.01) |
| *H01M 4/133* | (2010.01) |
| *H01M 4/134* | (2010.01) |
| *H01M 4/136* | (2010.01) |
| *H01M 4/137* | (2010.01) |
| *H01M 4/1391* | (2010.01) |
| *H01M 4/1393* | (2010.01) |
| *H01M 4/1395* | (2010.01) |
| *H01M 4/1397* | (2010.01) |
| *H01M 4/1399* | (2010.01) |
| *H01M 4/62* | (2006.01) |
| *H01M 10/052* | (2010.01) |
| *H01M 10/0525* | (2010.01) |
| *H01M 4/02* | (2006.01) |

(52) U.S. Cl.
CPC ............ *H01M 4/13* (2013.01); *H01M 4/139* (2013.01); *H01M 4/131* (2013.01); *H01M 4/133* (2013.01); *H01M 4/134* (2013.01); *H01M 4/136* (2013.01); *H01M 4/137* (2013.01); *H01M 4/1391* (2013.01); *H01M 4/1393* (2013.01); *H01M 4/1395* (2013.01); *H01M 4/1397* (2013.01); *H01M 4/1399* (2013.01); *H01M 4/622* (2013.01); *H01M 10/052* (2013.01); *H01M 10/0525* (2013.01); *H01M 2004/021* (2013.01)

(58) Field of Classification Search
USPC .................................. 429/217, 246; 524/365
See application file for complete search history.

(56) References Cited

U.S. PATENT DOCUMENTS

| | | | |
|---|---|---|---|
| 2005/0132562 A1* | 6/2005 | Saito ................... | H01M 4/0404 29/623.5 |
| 2006/0194116 A1* | 8/2006 | Suzuki .................. | H01M 2/166 429/251 |
| 2007/0015056 A1 | 1/2007 | Takei et al. | |
| 2008/0102196 A1 | 5/2008 | Morishima et al. | |
| 2009/0181300 A1 | 7/2009 | Kim | |
| 2009/0291360 A1* | 11/2009 | Kim ..................... | H01M 2/1653 429/145 |
| 2010/0221965 A1 | 9/2010 | Katayama et al. | |
| 2011/0064988 A1 | 3/2011 | Yu | |
| 2011/0129731 A1* | 6/2011 | Wakizaka ........... | H01M 4/0435 429/217 |
| 2011/0206963 A1 | 8/2011 | Fujita et al. | |
| 2011/0206974 A1* | 8/2011 | Inoue ................... | H01M 4/043 429/149 |
| 2012/0115036 A1 | 5/2012 | Lee et al. | |
| 2012/0148917 A1* | 6/2012 | Kobayashi ............... | C09D 5/24 429/211 |
| 2012/0189898 A1* | 7/2012 | Wakizaka ............. | H01M 2/145 429/144 |
| 2013/0040206 A1* | 2/2013 | Yoshida ................ | H01M 2/145 429/307 |

FOREIGN PATENT DOCUMENTS

| | | | |
|---|---|---|---|
| EP | 1667254 A1 | 6/2006 | |
| EP | 1667255 A1 | 6/2006 | |
| EP | 2485302 A1 | 8/2012 | |
| JP | 2005174586 A | 6/2005 | |
| JP | 2006172995 A | 6/2006 | |
| JP | 2008034215 A | 2/2008 | |
| JP | 2009259755 A | 11/2009 | |
| JP | 2011144245 A | 7/2011 | |
| JP | 2012028255 A | 2/2012 | |
| KR | 2080010166 A | 1/2008 | |
| KR | 20090077502 A | 7/2009 | |
| KR | 20110016416 A | 2/2011 | |
| KR | 20110097725 A | 8/2011 | |
| WO | WO 2011040474 A1 * | 4/2011 | ............ H01M 2/145 |
| WO | WO 2011105574 A1 * | 9/2011 | ............ H01M 2/145 |

OTHER PUBLICATIONS

Denki Kagaku Kogyo K.K., Introduction to Denka Black, Denki Kagaku Kogyo K.K.*
Okane, S., Machine translation of JP 2012-028255 A, Feb. 2012.*
Supplemental Search Report from European Application No. 13 85 9566, dated Jun. 18, 2015.
International Search Report from PCT/KR2013/011056, dated Mar. 26, 2014.

* cited by examiner

SLURRY INCLUDING INORGANIC PARTICLES WITH IMPROVE DISPERSIBILITY BY CONTROLLING PARTICLE SIZE AND SLURRY VISCOSITY

CROSS-REFERENCE TO RELATED APPLICATION

The present application is a continuation of International Application No. PCT/KR2013/011056 filed on Dec. 2, 2013, which claims priority to Korean Patent Application No. 10-2012-0138434 filed in the Republic of Korea on Nov. 30, 2012 and Korean Patent Application No. 10-2013-0147428 filed in the Republic of Korea on Nov. 29, 2013, the disclosures of which are incorporated herein by reference.

TECHNICAL FIELD

The present disclosure relates to a slurry with improved dispersibility and its use, and more particularly, to a slurry with improved dispersibility of inorganic particles by controlling a particle diameter of an inorganic matter in the slurry including inorganic particles, an organic binder polymer and a solvent as ingredients to adjust a viscosity of the slurry to a predetermined range, and a separator or an electrode compound for an electrochemical device manufactured using the slurry.

BACKGROUND ART

With the growing demand of batteries as an energy source, the interest in rechargeable electrochemical devices is increasing, and in particular, there is a further increase in the demand for and interest in lithium secondary batteries.

A lithium secondary battery includes an electrode assembly composed of a cathode, a separator, and an anode. The separator may be manufactured by coating a porous polymer substrate with a slurry including inorganic particles and an organic binder polymer, followed by drying, and the cathode and the anode are manufactured by applying, to an electrode current collector, a slurry for an electrode compound including inorganic particles serving as an active material and an organic binder polymer. The slurry includes the inorganic particles with the aim to intercalcate/deintercalate a lithium ion or improve ionic conductivity of an electrolyte solution, but the inorganic particles tend to sink over time. Accordingly, when the inorganic particles are not dispersed in the slurry uniformly or sink due to low dispersion stability, condensation or sediment occurs after the slurry is applied to the porous polymer substrate or the electrode current collector (hereinafter, collectively referred to as a 'substrate'). As a result, an adhesive strength between the inorganic particles in the slurry and the substrate reduces, and as charging and discharging of the battery proceeds, separation between the inorganic particles or between the inorganic particles and the substrate occurs, and consequently, the inorganic particles do not fulfill their function.

To solve the problem, studies have been conducted to improve dispersibility of inorganic particles, for example, a technology that uses a surfactant as a dispersant when dispersing an active material and carbon black in a solvent. However, because adsorption of a surfactant on the particle surface is low, a large amount of surfactants is required to achieve good dispersion stability. As a result, an amount of inorganic particles that can be included in a slurry relatively reduces, and consequently, inorganic particles do not tend to fulfill their intrinsic function. Also, if adsorption of a surfactant on particles is insufficient, inorganic particles are prone to agglomeration. Also, a general surfactant has a remarkably low dispersion effect in an organic solvent, compared to dispersion in a water-soluble solution.

DISCLOSURE

Technical Problem

The present disclosure is designed to solve the problem that, in a slurry including inorganic particles as an ingredient, the inorganic particles do not fulfill their intrinsic function due to premature sinking by insufficient dispersibility of the inorganic particles. That is, the present disclosure is directed to providing a slurry with improved dispersibility of inorganic particles, and a separator and an electrode compound for an electrochemical device with excellent battery performance, manufactured using the slurry.

Technical Solution

According to an exemplary embodiment of the present disclosure, provided is a slurry including inorganic particles, an organic binder polymer, and a solvent, wherein the inorganic particles have a diameter in a range of 0.01 μm to 15 μm, and the slurry has a viscosity of which a lower bound is a value obtained from the following Equation based on the diameter of the inorganic particles and an upper bound is 10,000 cP:

$$\eta \geq 40 d^2 \qquad \text{[Equation 1]}$$

where η denotes a viscosity of a slurry, and d denotes an average diameter of inorganic particles.

The slurry is characterized by including 10 to 50 parts by weight of the inorganic particles and 1 to 10 parts by weight of the organic binder polymer based on 100 parts by weight of the solvent.

The inorganic particles may be selected from the group consisting of an inorganic particle having a dielectric constant greater than or equal to 5, an inorganic particle having a lithium ion delivery capability, and a mixture thereof.

The inorganic particle having the dielectric constant greater than or equal to 5 may be any one selected from the group consisting of $BaTiO_3$, $Pb(Zr_x,Ti_{1-x})O_3$ (PZT, 0<x<1), $Pb_{1-x}La_xZr_{1-y}Ti_yO_3$(PLZT, 0<x<1, 0<y<1), $(1-x)Pb(Mg_{1/3}Nb_{2/3})O_{3-x}PbTiO_3$(PMN-PT, 0<x<1), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures thereof.

The inorganic particle having the lithium ion delivery capability may be any one selected from the group consisting of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ ($Li_xSi_yS_z$, 0<x<3, 0<y<2, 0<z<4)-based glass and $P_2S_5$ ($Li_xP_yS_z$, 0<x<3, 0<y<3, 0<z<7)-based glass, or mixtures thereof.

The inorganic particles may be any one selected from the group consisting of lithium cobalt oxide, lithium nickel oxide, lithium manganese oxide, lithium copper oxide, vanadium oxide and a disulfide compound, or mixtures thereof.

The inorganic particles may be any one selected from the group consisting of non-graphitizable carbon, graphite-based carbon, metal composite oxide, a lithium metal, a lithium alloy, a silicon-based alloy, a tin-based alloy, a conductive polymer and a Li—Co—Ni-based compound, or mixtures thereof.

The organic binder polymer may be any one selected from the group consisting of a polyvinylidene fluoride (PVdF)-based polymer compound, polyvinylidene fluoride-co-trichloroethylene, polyvinylidene fluoride-co-hexafluoropropylene, polymethyl methacrylate, polyacrylonitrile, polyvinyl pyrrolidone, polyvinylacetate, polyethylene-co-vinyl acetate, polyethyleneoxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, an acrylonitrile-styrene-butadiene copolymer and polyimide, or mixtures thereof.

The solvent may be any one selected from acetone, tetrahydrofuran, methylene chloride, chloroform, dimethylformamide, N-methyl-2-pyrrolidone (NMP), cyclohexane and water, or mixtures thereof.

According to an exemplary embodiment of the present disclosure, provided is a composite separator for an electrochemical device manufactured using the slurry described in the foregoing.

According to an exemplary embodiment of the present disclosure, provided is a cathode compound for an electrochemical device manufactured using the slurry described in the foregoing.

According to an exemplary embodiment of the present disclosure, provided is an anode compound for an electrochemical device manufactured using the slurry described in the foregoing.

According to an exemplary embodiment of the present disclosure, provided is an electrochemical device comprising a cathode, an anode, and a separator interposed between the cathode and the anode, wherein at least one of the cathode, the anode, and the separator is manufactured using the slurry described in the foregoing.

Advantageous Effects

A viscosity of a slurry is adjusted to a predetermined range by using, in the slurry, inorganic particles having a predetermined range of diameters according to the present disclosure, and as a result, dispersibility of the inorganic particles is remarkably improved and their sinking rate also remarkably reduces. Also, in a separator and an electrode compound manufactured using the slurry, a relatively large amount of inorganic particles may be used, and a separation phenomenon between inorganic particles or between inorganic particles and a substrate is suppressed, thereby effectively preventing a reduction in battery performance.

DESCRIPTION OF THE PREFERRED EMBODIMENT

Figure 1A:
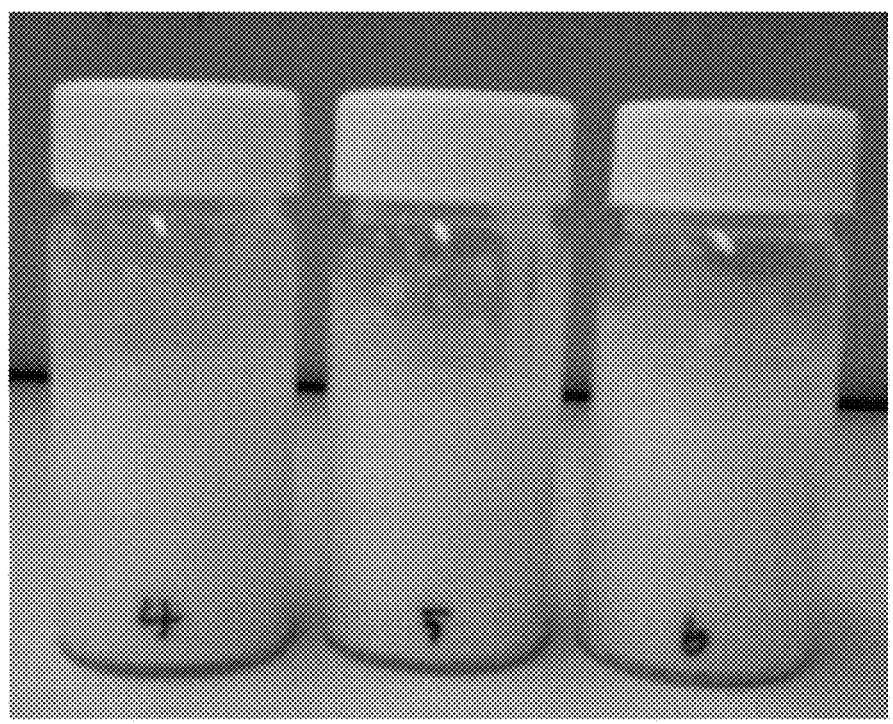
FIGS. 1a and 1b show a slurry (FIG. 1a) obtained immediately after Embodiment example 1-1 was prepared and a slurry (FIG. 1b) obtained after one day.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Also, the description proposed herein is just a preferable example for the purpose of illustrations only, not intended to limit the scope of the disclosure, so it should be understood that other equivalents and modifications could be made thereto without departing from the spirit and scope of the disclosure.

A slurry according to an exemplary embodiment of the present disclosure may be used to manufacture a separator or an electrode compound for an electrochemical device, and the slurry including inorganic particles, an organic binder polymer, and a solvent is characterized by the inorganic particles having a diameter in a range of 0.01 μm to 15 μm and the slurry having a viscosity of which a lower bound is a value obtained from the following Equation based on the diameter of the inorganic particles and an upper bound is 10,000 cP:

$$\eta \geq 40 d^2 \qquad \text{[Equation 1]}$$

where $\eta$ denotes a viscosity of a slurry, and d denotes an average diameter of inorganic particles.

Equation 1 is based on the following Equation 3 that is expressed, by a scaling law, in a simple form of a Stoke-Einstein equation of the following Equation 2 indicating that a sinking rate is generally a function of a particle size and a fluid viscosity:

$$v_s = \frac{2}{9} \frac{(\rho_p - \rho_f)}{\eta} g r^2 \qquad \text{[Equation 2]}$$

where $v_s$ denotes a sinking rate of spherical inorganic particles (unit: μm/s), $\rho_p$ denotes a particle density (unit: kg/m$^3$), $\rho_f$ denotes a fluid density (unit: kg/m$^3$), $\eta$ denotes a fluid viscosity (unit: Ns/m$^2$), g denotes a gravitational acceleration (unit: μm/s$^2$), and r denotes a radius of the spherical inorganic particles (unit: μm).

$$\eta > \left(\frac{\eta_0}{d_0^2}\right) r^2 = 40 d^2 \qquad \text{[Equation 3]}$$

where $\eta$ denotes a fluid viscosity (unit: cP), d denotes a diameter of spherical inorganic particles (unit: μm), and $\eta_0$ and $d_0^2$ denote, respectively, an initial fluid viscosity (unit: cP) and an initial diameter of spherical inorganic particles (unit: μm).

The slurry according to an exemplary embodiment of the present disclosure is characterized by using inorganic particles having a diameter in a range of 0.01 μm to 15 μm. For example, as used in Embodiment examples 1-1 and 2-1 of the present disclosure, inorganic particles having a diameter in a range of 200 to 500 nm may be used, and inorganic particles having a diameter greater than 10 μm and less than or equal to 15 μm may be used as well. In this instance, the slurry has a viscosity ranging from an upper bound of 10,000 cP to a lower bound set using Equation 1 based on the diameter of the inorganic particles.

Also, the slurry may include 10 to 50 parts by weight of the inorganic particles and 1 to 10 parts by weight of the organic binder polymer based on 100 parts by weight of the solvent.

The use of the inorganic particles less than 10 parts by weight is insufficient for a viscosity change by the inorganic particles, and the use of the inorganic particles higher than 50 parts by weight is not easy to manufacture an electrode compound or a separator.

The organic binder polymer particles included in the slurry may contribute to viscosity change of the slurry, and the use of the organic binder polymer less than 1 part by weight based on 100 parts by weight of the slurry solvent is insufficient for a viscosity change by the organic binder polymer particles, and the use of the organic binder polymer higher than 10 parts by weight may reduce the battery performance.

According to an exemplary embodiment of the present disclosure, the slurry of an exemplary embodiment of the present disclosure may be applied to a composite separator including a porous polymer substrate and a porous coating layer formed on at least one surface of the porous polymer substrate and including a mixture of inorganic particles and an organic binder polymer.

The composite separator is manufactured by a method including preparing a planar porous polymer substrate having a pore, and forming a porous coating layer by coating a slurry including inorganic particles, an organic binder polymer, and a solvent on at least one surface of the porous polymer substrate.

The term 'porous coating layer' as used herein includes a mixture of inorganic particles and a binder polymer, and represents a structure that the inorganic particles are bonded to one another by the binder polymer while the inorganic particles are packed in contact with one another, where interstitial volumes between the inorganic particles are formed thereby, and such interstitial volumes between the inorganic particles are defined as an empty space and form pores.

The inorganic particles that may be used in the slurry for manufacturing the composite separator (also called a 'slurry for a separator') may be selected from the group consisting of an inorganic particle having a dielectric constant greater than or equal to 5, an inorganic particle having a lithium ion delivery capability, and a mixture thereof.

As a specific example, the inorganic particle having a dielectric constant greater than or equal to 5 may be any one selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures thereof.

Also, as a specific example, the inorganic particle having a lithium ion delivery capability may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$)-based glass and $P_2S_5$ ($Li_xP_yS_z$, $0<x<3$, $0<y<3$, $0<z<7$)-based glass, or mixtures thereof.

For the purpose of forming a film having a uniform thickness and ensuring a proper porosity as well as adjusting the viscosity of the slurry, the inorganic particles preferably have a diameter in a range of 0.01 μm to 15 μm. When the diameter is less than 0.01 μm, a specific surface area increases which hinders the adjustment of physical properties of an organic/inorganic composite porous separator, and when the diameter exceeds 15 μm, an organic/inorganic composite porous separator manufactured by the same solid content increases in thickness and deteriorates in mechanical properties, and an excessively large pore size increases a possibility that an internal short circuit will occur during battery charging and discharging.

As such inorganic particles are used, the inorganic particles may be present in the slurry for the separator in a physically and chemically stable manner even though the inorganic particles are included in the slurry at a higher concentration.

The organic binder polymer that may be used in the slurry for the separator may be any one selected from the group consisting of polyvinylidene fluoride-co-hexafluoro propylene, polyvinylidene fluoride-co-trichloroethylene, polymethyl methacrylate, polyacrylonitrile, polyvinyl pyrrolidone, polyvinylacetate, polyethylene-co-vinyl acetate, polyethyleneoxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, or mixtures thereof.

The porous polymer substrate that may be used in the composite separator is not limited to a specific type if it is a general one used in the art, and may use, for example, a porous polymer film that is formed from polyolefin such as polyethylene or polypropylene and implements a shut-down function at temperature of 80 to 130° C. It is obvious that the porous polymer film may be manufactured using other polymers than polyolefin, for example, polyester and the like. Also, as the porous polymer substrate, a porous polymer non-woven substrate manufactured from polyolefin or polyethylene terephthalate generally used in the art may be used as well.

The solvent that may be used to manufacture the composite separator each may be, independently, any one selected from acetone, tetrahydrofuran, methylene chloride, chloroform, dimethylformamide, N-methyl-2-pyrrolidone (NMP), cyclohexane and water, or mixtures thereof.

In another exemplary embodiment of the present disclosure, the slurry may correspond to a slurry for use in an electrode compound (hereinafter referred to as a 'slurry for an electrode compound'). The slurry for the electrode compound includes inorganic particles such as an anode active material or a cathode active material, and an organic binder polymer, and the prepared slurry for the electrode compound is applied to an anode current collector or a cathode current collector.

The inorganic particles used in the slurry for the cathode compound according to an exemplary embodiment of the present disclosure, that is, the cathode active material, may include, but is not limited to, layered compounds such as lithium cobalt oxide ($LiCoO_2$) and lithium nickel oxide ($LiNiO_2$) or compounds substituted by at least one transition metal; lithium manganese oxide represented by a chemical formula $Li_{1+x}Mn_{2-x}O_4$ (here, $x=0\sim0.33$) or $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; Ni site-type lithium nickel oxide represented by a chemical formula $LiNi_{1-x}M_xO_2$ (here, M=Co, Mn, Al, Cu, Fe, Mg, B or Ga, $x=0.01\sim0.3$); lithium manganese composite oxide represented by a chemical formula $LiMn_{2-x}M_xO_2$ (here, M=Co, Ni, Fe, Cr, Zn or Ta, $x=0.01\sim0.1$) or $Li_2Mn_3MO_8$ (here, M=Fe, Co, Ni, Cu or Zn); $LiMn_2O_4$ in which a portion of Li in a chemical formula is substituted by an alkaline earth metal ion; disulfide compounds; $Fe_2(MoO_4)_3$, and the like.

Also, the inorganic particles used in the slurry for the anode compound, that is, the anode active material, may use, for example, carbon such as non-graphitizable carbon and graphite-based carbon; metal composite oxide such as $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, elements of Groups 1, 2, and 3 in the periodic table, halogen; $0 < x \leq 1$; $1 \leq y \leq 3$; $1 \leq z \leq 8$); lithium metals; lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials, and the like, however the present disclosure is not limited thereto. The graphite may have an amorphous shape, a planar shape, a flake-like shape, a granular shape, and the like. Also, a silicon-graphite or tin-graphite composite active material produced by mixing the graphite with silicon or tin and pulverizing and sintering the mixture may be used.

In the slurry for the electrode compound according to an exemplary embodiment of the present invention, a general organic binder polymer in the art may be used so long as it satisfies the object of the present disclosure to provide a slurry including inorganic particles with a predetermined range of diameters and having a predetermined range of viscosity, but a preferred organic binder polymer may be any one selected from the group consisting of polyvinylidene fluoride-co-hexafluoro propylene, polyvinylidene fluoride-co-trichloroethylene, polymethyl methacrylate, polyacrylonitrile, polyvinyl pyrrolidone, polyvinylacetate, polyethylene-co-vinyl acetate, polyethyleneoxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, or mixtures thereof.

In addition to the inorganic particles, the slurry for the electrode compound according to the present disclosure may further include other ingredients, for example, a conductive material, a viscosity adjusting agent, a filler, a coupling agent, an adhesion promoter, and the like, selectively or in combination.

As the solvent, a solvent that may maintain the slurry as a liquid at room temperature and atmospheric pressure is preferred, and the solvent may include, for example, but is not limited to, water; alcohols such as methanol, ethanol, propanol, isopropanol, butanol, isobutanol, s-butanol, t-butanol, pentanol, isopentanol, and hexanol; ketones such as acetone, methylethylketone, methylpropylketone, ethylpropylketone, cyclopentanone, cyclohexanone, and cycloheptanone; ethers such as methylethylether, diethylether, dipropylether, diisopropylether, dibutylether, diisobutylether, di-n-amylether, diisoamylether, methylpropylether, methylisopropylether, methylbutylether, ethylpropylether, ethylisobutyl ether, ethyl-n-amylether, ethylisoamylether, and tetrahydrofuran; lactones such as γ-butyrolactone, and δ-butyrolactone; lactams such as β-lactam; cyclic aliphatics such as cyclopentane, cyclohexane, and cycloheptane; aromatic hydrocarbons such as benzene, toluene, o-xylene, m-xylene, p-xylene, ethylbenzene, propylbenzene, isopropylbenzene, butylbenzene, isobutylbenzene, and n-amylbenezene; aliphatic hydrocarbons such as heptane, octane, nonane, and decane; chain and cyclic amides such as dimethylformamide and N-methylpyrrolidone; esters such as methyl lactate, ethyl lactate, propyl lactate, butyl lactate, and methyl benzoate; liquid materials from which a solvent of an electrolyte solution to be described later is made, and the like, and in this instance, a mixture of about two to five types of solvents may be used. It is preferred to use a solvent having a boiling point higher than or equal to 80° C., preferably, higher than or equal to 85° C. in terms of an electrode manufacturing process.

The conductive material is a component for further improving conductivity of the inorganic particles, and may be included in a general content known to an ordinary person skilled in the art. The conductive material is not limited to a specific type if it is conductive while not causing a chemical change in a corresponding battery, and may use, for example, graphite, carbon black, a conductive fiber, conductive metal oxide, and the like.

The filler is a supplementary component for suppressing expansion of the electrode, and may use, for example, olefin-based polymers such as polyethylene and polypropylene, fibrous materials such as glass fiber and carbon fibers, and the like.

The coupling agent is a supplementary component for increasing an adhesive strength between the inorganic particles and the organic binder polymer.

The adhesion promoter is a supplementary component added to improve an adhesive strength of the inorganic particles to the current collector in the slurry for the electrode compound, and may use, for example, oxalic acid, adipic acid, and the like.

The slurry for the electrode compound according to the present disclosure is applied to an electrode current collector such as an electrode foil, and the current collector may be classified into an anode current collector and a cathode current collector based on an electrode type.

The anode current collector generally has a thickness in a range of 3 to 500 μm. The anode current collector is not limited to a specific type if it is conductive while not causing a chemical change in a corresponding battery, and may use, for example, copper, stainless steel, aluminum, nickel, titanium, sintered carbon, copper or stainless steel treated with carbon, nickel, titanium or silver on the surface thereof, aluminum-cadmium alloys, and the like.

The cathode current collector generally has a thickness in a range of 3 to 500 μm. The cathode current collector is not limited to a specific type if it has high conductivity while not causing a chemical change in a corresponding battery, and may use, for example, stainless steel, aluminum, nickel, titanium, sintered carbon, aluminum or stainless steel treated with carbon, nickel, titanium or silver on the surface thereof, and the like.

These current collector may have a fine surface texture to reinforce the bond strength of the inorganic particles as the active material, and may be used in various shapes, for example, a film, a sheet, a foil, a net, a porous product, a foam, a non-woven product, and the like.

The present disclosure also provides the separator and the electrode manufactured as described in the foregoing. The separator and the electrode form an electrode assembly by interposing the separator between the cathode and the anode, and a lithium secondary battery may be manufactured by injecting a lithium salt-containing non-aqueous electrolyte solution into the electrode assembly.

The lithium salt-containing non-aqueous electrolyte includes a non-aqueous electrolyte solution and a lithium salt. As the non-aqueous electrolyte solution, a non-aqueous organic solvent, a solid electrolyte, an inorganic solid electrolyte, and the like, may be used.

The lithium salt is a material that dissolves well in the non-aqueous electrolyte, may use, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, imide, and the like.

The organic solvent is not limited to a specific type, and may use a general organic solvent in the art so long as it satisfies the object of the present disclosure.

Also, an additive may be further included in the non-aqueous electrolyte solution with the aim to improve charging and discharging characteristics, flame retardancy, and the like.

While the foregoing description is provided to describe the principles of the present disclosure by way of illustration only, it will be apparent to those skilled in the art that various changes and modifications may be made without departing from the spirit and scope of the disclosure. Accordingly, it should be clearly understood that exemplary embodiments disclosed in the present disclosure are by way of illustration and example only and not intended to limit the spirit and scope of the disclosure, and that the present disclosure is not limited thereto. It should be understood that the spirit and scope of the present disclosure is defined by the appended claims, with equivalents of the claims to be included therein.

Embodiment Example 1-1: Manufacture of Slurry for Separator

Figure 1B:
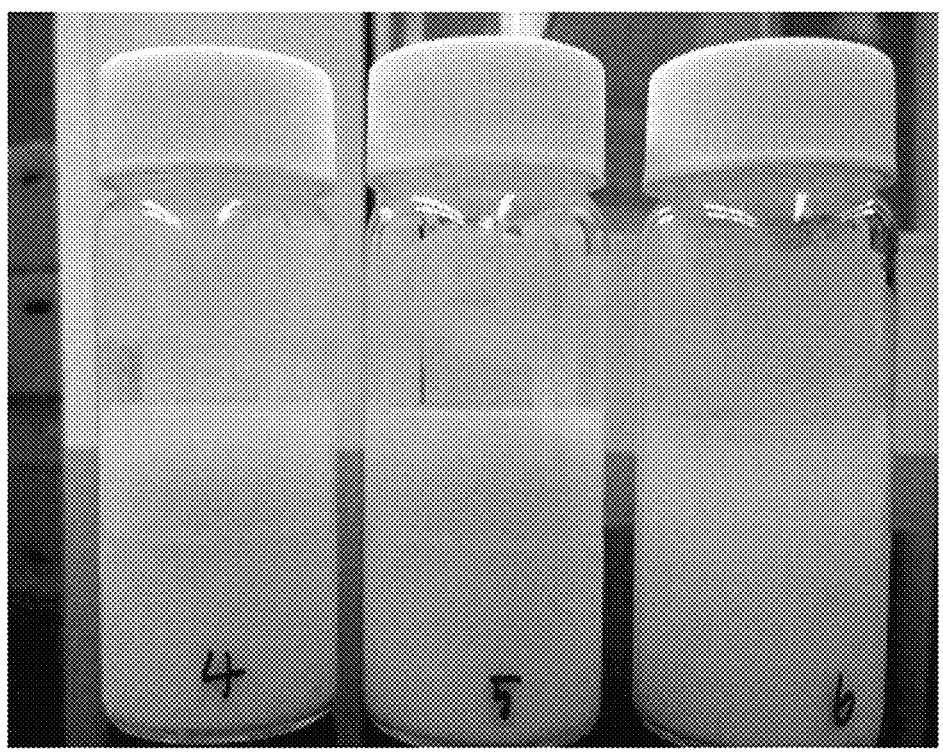

A slurry was obtained by dispersing, in 400 g of acetone, 80 g of alumina inorganic particles having a size of 500 nm diameter (Nippon Light Metal, LS-235) and 20 g of poly (vinylidene fluoride-hexafluoropropylene (hereinafter referred to as PVdF-HFP) (Arkema, LBG2). The viscosity of the prepared slurry was 38 cP and satisfied Equation 3. This experiment was conducted in triplicate, and the slurry obtained immediately thereafter was shown in FIG. 1a and the slurry obtained after one day was shown in FIG. 1b.

Embodiment Example 1-2: Manufacture of Separator

A 16 μm-thick polyolefin film (Celgard, C210) was used as a porous polymer substrate, and slurry obtained immediately after Embodiment example 1-1 was prepared was used to coat the porous copolymer substrate and then dried to remove the solvent to finally obtain a composite separator. The thickness of the manufactured separator was uniformly measured within 0.5 μm with respect to 26 μm.

Embodiment Example 2-1: Manufacture of Slurry for Separator

A slurry was obtained by dispersing, in 400 g of acetone, 80 g of boehmite inorganic particles having a size of 200 nm diameter (Nabaltec, Actilox 200SM) and 20 g of poly (vinylidene fluoride-co-hexafluoropropylene (hereinafter referred to as PVdF-HFP) (Arkema, Kynar 2751). The viscosity of the prepared slurry was 9 cP and satisfied Equation 3.

Embodiment Example 2-2: Manufacture of Separator

A 16 μm-thick polyolefin film (Celgard, C210) was used as a porous polymer substrate, and slurry obtained immediately after Embodiment example 2-1 was prepared was used to coat the porous copolymer substrate and then dried to remove the solvent to finally obtain a composite separator. The thickness of the manufactured separator was uniformly measured within 0.5 μm with respect to 26 μm.

Comparative Example 1-1: Manufacture of Slurry for Separator

Figure 2A:
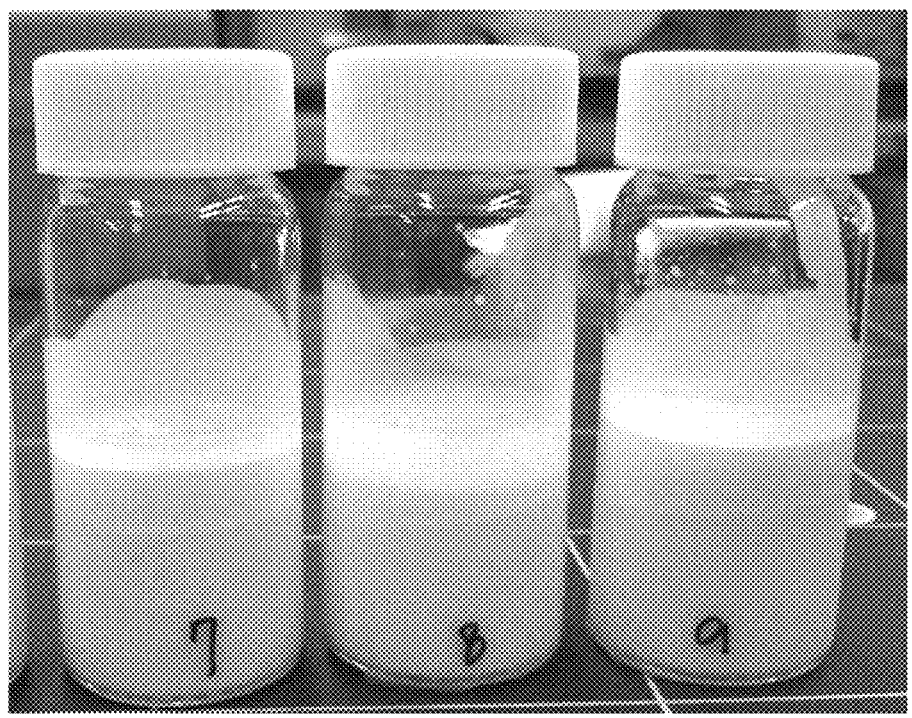
FIGS. 2a and 2b show a slurry (FIG. 2a) obtained immediately after Comparative example 1-1 was prepared and a slurry (FIG. 2b) obtained after one day.
Figure 2B:
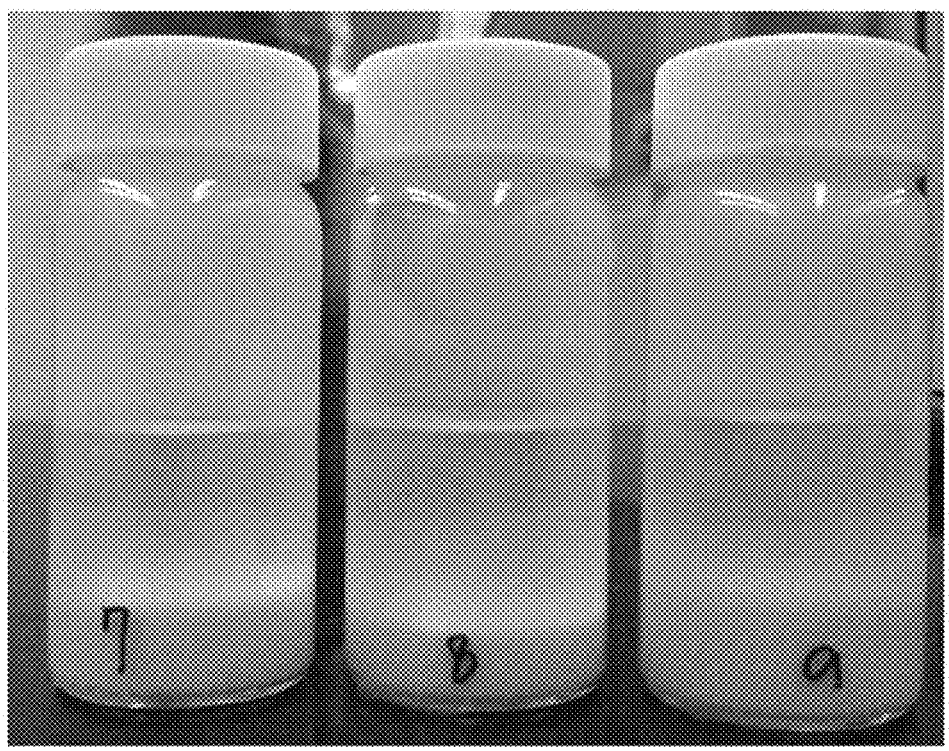

A slurry was obtained in the same manner as Embodiment example 1-1 except that PVdF-HFP (Arkema, Kynar 2751) having a molecular weight of 287,000 was used. The viscosity of the prepared slurry was 7 cP, and did not satisfy Equation 3. This experiment was conducted in triplicate, and the slurry obtained immediately thereafter was shown in FIG. 2a and the slurry obtained after one day was shown in FIG. 2b.

Comparative Example 1-2: Manufacture of Separator

A 16 μm-thick polyolefin film (Celgard, C210) was used as a porous polymer substrate, and slurry obtained immediately after Comparative example 1-1 was prepared was used to coat the porous copolymer substrate and then dried to remove the solvent to finally obtain a composite separator. The thickness of the manufactured separator was non-uniformly measured in a range of 24 μm to 35 μm with respect to 26 μm, and as a result, reliable data was not obtained.

What is claimed is:

1. A slurry for a porous coating layer of a composite separator, comprising:
   inorganic particles;
   a polymer; and
   a solvent,
   wherein the inorganic particles have an average diameter ranging from 0.01 μm to 15 μm,
   wherein the polymer consists essentially of any one selected from the group consisting of a polyvinylidene fluoride (PVdF), polyvinylidene fluoride-co-hexafluoropropylene, polyvinylidene fluoride-co-trichloroethylene, polyvinyl pyrrolidone, polyvinylacetate, polyethylene-co-vinyl acetate, cyanoethylpullulan, cyanoethylsucrose, pullulan, and polyimide, and mixtures thereof,
   wherein the solvent is any one selected from acetone, tetrahydrofuran, methylene chloride, chloroform, dimethylformamide, N-methyl-2-pyrrolidone (NMP), cyclohexane and mixtures thereof,
   wherein 10 to 50 parts by weight of the inorganic particles and 1 to 10 parts by weight of the polymer are present in the slurry based on 100 parts by weight of the solvent, and
   wherein the slurry has a viscosity of which a lower bound is a value obtained from the following Equation 1 based on the average diameter of the inorganic particles and an upper bound is 10,000 cP:

$$\eta \geq 40d^2 \quad \text{[Equation 1]}$$

where η denotes the viscosity of the slurry in units of centipoise (cP), and d denotes the average diameter of inorganic particles in units of micrometers (μm).

2. The slurry according to claim 1,
   wherein the lower bound of the viscosity of the slurry is a value obtained from the following Equation 2:

$$\eta = 40d^2 \quad \text{[Equation 2]}$$

where η denotes the viscosity of the slurry in units of centipoise (cP), and d denotes the average diameter of inorganic particles in units of micrometers (μm).

3. The slurry of claim 1,
wherein the inorganic particles have an average diameter ranging from 0.2 μm to 2.5 μm, and
wherein the slurry has a viscosity ranging from 9 to 300 centipoise (cP).

4. The slurry according to claim 1, wherein the inorganic particles are selected from the group consisting of an inorganic particle having a dielectric constant greater than or equal to 5, an inorganic particle having a lithium ion delivery capability, and a mixture thereof.

5. The slurry according to claim 4, wherein the inorganic particle having the dielectric constant greater than or equal to 5 is any one selected from the group consisting of $BaTiO_3$, $Pb(Zr_x,Ti_{1-x})O_3$ wherein $0<x<1$, $Pb_{1-x}La_xZr_{1-y}Ti_yO_3$, wherein $0<x<1$, $0<y<1$, $(1-x)Pb(Mg_{1/3}Nb_{2/3})O_{3-x}PbTiO_3$, wherein $0<x<1$, $HfO_2$, $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, and mixtures thereof.

6. The slurry according to claim 4, wherein the inorganic particle having the lithium ion delivery capability is any one selected from the group consisting of $Li_3PO_4$, $Li_xTi_y(PO_4)_3$, wherein $0<x<2$, $0<y<3$, $Li_xAl_yTi_z(PO_4)_3$, wherein $0<x<2$, $0<y<1$, $0<z<3$, $(LiAlTiP)_xO_y$-based glass, wherein $0<x<4$, $0<y<13$, $Li_xLa_yTiO_3$, wherein $0<x<2$, $0<y<3$, $Li_xGe_yP_zS_w$, wherein $0<x<4$, $0<y<1$, $0<z<1$, $0<w<5$, $Li_xN_y$, wherein $0<x<4$, $0<y<2$, $SiS_2$-based glass represented by $Li_xSi_yS_z$, wherein $0<x<3$, $0<y<2$, $0<z<4$, $P_2S_5$-based glass represented by $Li_xP_yS_z$, wherein $0<x<3$, $0<y<3$, $0<z<7$, and mixtures thereof.

7. A slurry for a porous coating layer of a composite separator, comprising:
inorganic particles;
a polymer; and
a solvent,
wherein the inorganic particles have an average diameter ranging from 0.01 μm to 15 μm,
wherein the polymer consists essentially of any one selected from the group consisting of a polyvinylidene fluoride (PVdF), polyvinylidene fluoride-co-hexafluoropropylene, polyvinylidene fluoride-co-trichloroethylene, and mixtures thereof,
wherein the solvent is any one selected from acetone, tetrahydrofuran, methylene chloride, chloroform, dimethylformamide, N-methyl-2-pyrrolidone (NMP), cyclohexane and mixtures thereof,
wherein 10 to 50 parts by weight of the inorganic particles and 1 to 10 parts by weight of the polymer are present in the slurry based on 100 parts by weight of the solvent, and
wherein the slurry has a viscosity of which a lower bound is a value obtained from the following Equation 1 based on the average diameter of the inorganic particles and an upper bound is 10,000 cP:

$$\eta \geq 40d^2 \qquad \text{[Equation 1]}$$

where η denotes the viscosity of the slurry in units of centipoise (cP), and d denotes the average diameter of inorganic particles in units of micrometers (μm).

8. A slurry for a porous coating layer of a composite separator, comprising:
inorganic particles;
an organic binder polymer; and
a solvent,
wherein the inorganic particles have an average diameter ranging from 0.01 μm to 15 μm,
wherein the organic binder polymer consists essentially of polyvinylidene fluoride-co-hexafluoropropylene,
wherein the solvent is any one selected from acetone, tetrahydrofuran, methylene chloride, chloroform, dimethylformamide, N-methyl-2-pyrrolidone (NMP), cyclohexane and mixtures thereof,
wherein 10 to 50 parts by weight of the inorganic particles and 1 to 10 parts by weight of the polymer are present in the slurry based on 100 parts by weight of the solvent, and
wherein the slurry has a viscosity of which a lower bound is a value obtained from the following Equation 1 based on the average diameter of the inorganic particles and an upper bound is 10,000 cP:

$$\eta \geq 40d^2 \qquad \text{[Equation 1]}$$

where η denotes the viscosity of the slurry in units of centipoise (cP), and d denotes the average diameter of inorganic particles in units of micrometers (μm).

9. The slurry of claim 8, wherein the inorganic particles have an average diameter ranging from 0.2 μm to 2.5 μm, and wherein the slurry has a viscosity ranging from 9 to 300 centipoise (cP).

10. A slurry for a porous coating layer of a composite separator, comprising:
inorganic particles;
a polymer; and
a solvent,
wherein the inorganic particles are selected from the group consisting of an inorganic particle having a dielectric constant greater than or equal to 5, an inorganic particle having a lithium ion delivery capability, and a mixture thereof,
wherein the polymer consists essentially of any one selected from the group consisting of a polyvinylidene fluoride (PVdF), polyvinylidene fluoride-co-hexafluoropropylene, polyvinylidene fluoride-co-trichloroethylene, polyvinyl pyrrolidone, polyvinylacetate, polyethylene-co-vinyl acetate, cyanoethylpullulan, cyanoethylsucrose, pullulan, and polyimide, and mixtures thereof,
wherein 10 to 50 parts by weight of the inorganic particles and 1 to 10 parts by weight of the polymer are present in the slurry based on 100 parts by weight of the solvent, and
wherein the slurry has a viscosity ranging from 9 to 300 centipoise (cP).

11. An electrochemical device comprising a cathode, an anode, and a separator interposed between the cathode and the anode,
wherein the separator is manufactured using the slurry defined in claim 1.

* * * * *